(12) United States Patent
Taira et al.

(10) Patent No.: US 8,976,820 B2
(45) Date of Patent: Mar. 10, 2015

(54) PASSIVE Q-SWITCH-TYPE SOLID LASER APPARATUS (75) Inventors: Takunori Taira, Okazaki (JP); Simon Joly, Grenoble (FR); Rakesh Bhandari, Okazaki (JP)

(73) Assignee: Inter-University Research Institute Corporation National Institutes of Natural Sciences, Tokyo (JP)

( * ) Notice: Subject to any disclaimer, the term of this patent is extended or adjusted under 35 U.S.C. 154(b) by 0 days.

(21) Appl. No.: 14/006,742
(22) PCT Filed: May 21, 2012
(86) PCT No.: PCT/JP2012/003313
§ 371 (c)(1),
(2), (4) Date: Sep. 23, 2013
(87) PCT Pub. No.: WO2012/160801
PCT Pub. Date: Nov. 29, 2012

(65) Prior Publication Data
US 2014/0010247 A1    Jan. 9, 2014

(30) Foreign Application Priority Data
May 20, 2011   (JP) ................. 2011-113610

(51) Int. Cl.
*H01S 3/11* (2006.01)
*H01S 3/113* (2006.01)
(Continued)

(52) U.S. Cl.
CPC ............. *H01S 3/1115* (2013.01); *H01S 3/113* (2013.01); *H01S 3/042* (2013.01); *H01S 3/0621* (2013.01);
(Continued)

(58) Field of Classification Search
USPC .................... 372/10–11, 18, 34, 99
See application file for complete search history.

(56) References Cited

U.S. PATENT DOCUMENTS

| 2008/0089372 | A1 | 4/2008 | Izawa et al. |
| 2008/0247425 | A1 | 10/2008 | Welford |
| 2012/0140782 | A1* | 6/2012 | Sotelo et al. .................... 372/10 |
| 2012/0242973 | A1* | 9/2012 | Tunnermann et al. ....... 356/4.01 |

FOREIGN PATENT DOCUMENTS

| JP | A-11-4030 | 1/1999 |
| JP | A-2006-186230 | 7/2006 |
| JP | A-2008-258627 | 10/2008 |

OTHER PUBLICATIONS

Zayhowski, "Microchip Lasers," *Optical Materials*, 1999, vol. 11, pp. 255-267.

(Continued)

*Primary Examiner* — Dung Nguyen
(74) *Attorney, Agent, or Firm* — Oliff PLC (57) ABSTRACT

To provide a passive Q-switch-type solid laser apparatus for outputting a high peak-power pulse laser whose pulse energy is large and pulse-time width is small. A passive Q-switch-type solid laser apparatus has: two reflection elements for forming an oscillator; a solid gain medium being disposed between the two reflection elements; a saturable absorber being disposed between the two reflection elements; an excitation device for exciting the solid gain medium; and a cross section control device for making at least one of a stimulated emission cross section of the solid gain medium and an absorption cross section of the saturable absorber closer to another one of them; and the cross section control device is equipped with at least one or both of a temperature control device for retaining the solid gain medium at a predetermined temperature and an oscillatory-wavelength control device for fixating an oscillatory wavelength at a predetermined wavelength.

8 Claims, 6 Drawing Sheets (51) Int. Cl.
*H01S 3/042* (2006.01)
*H01S 3/06* (2006.01)
*H01S 3/102* (2006.01)
*H01S 3/16* (2006.01)
*H01S 3/02* (2006.01)
*H01S 3/04* (2006.01)

(52) U.S. Cl.
CPC ............. *H01S 3/1028* (2013.01); *H01S 3/1611* (2013.01); *H01S 3/1673* (2013.01); *H01S 3/025* (2013.01); *H01S 3/0405* (2013.01); *H01S 3/0604* (2013.01); *H01S 3/0612* (2013.01)
USPC .................. 372/10; 372/11; 372/18; 372/34; 372/99; 372/102

(56) References Cited

OTHER PUBLICATIONS

Bai et al., "Passively Q-Switched Nd:YVO$_4$ Laser with a Cr$^{4+}$:YAG Crystal Saturable Absorber," *Applied Optics*, Apr. 1997, vol. 36, No. 12, pp. 2468-2472.

Sakai et al., ">1 MW Peak Power Single-Mode High-Brightness Passively Q-Switched Nd$^{3+}$:YAG Microchip Laser," *Optics Express*, Nov. 2008, vol. 16, No. 24, pp. 19891-19899.

Pavel et al., "High Average Power Diode End-Pumped Composite Nd:YAG Laser Passively Q-Switched by Cr$^{4+}$:YAG Saturable Absorber," *Jpn. J. Appl. Phys.*, 2001, vol. 40, pp. 1253-1259.

Pavel et al., "Enhancing Performances of a Passively Q-Switched Nd:YAG/Cr$^{4+}$:YAG Microlaser with a Volume Bragg Grating Output Coupler," *Optics Letters*, May 2010, vol. 35, No. 10, pp. 1617-1619.

Kimmelma et al., "Thermal Tuning of Laser Pulse Parameters in Passively Q-Switched Nd:YAG Lasers," *Applied Optics*, Aug. 2008, vol. 47, No. 23, pp. 4262-4266.

Bass et al., "The Temperature Dependence of Nd$^{3+}$ Doped Solid-State Lasers," *IEEE Journal of Quantum Electronics*, Jun. 2003, vol. 39, No. 6, pp. 741-748.

International Search Report issued in International Patent Application PCT/JP2012/003313 dated Jul. 17, 2012 (with translation).

\* cited by examiner

PASSIVE Q-SWITCH-TYPE SOLID LASER APPARATUS

TECHNICAL FIELD

The present invention relates to a passive Q-switch-type solid laser apparatus for outputting a high peak-power pulse laser.

BACKGROUND ART

Mode lock techniques and Q-switch techniques are available for generating short pulse lasers. A mode lock technique is one in which a vertical mode being determined by an interval between oscillators is locked by modulating it with an electrooptic modulation device, for instance. Mode lock techniques are mainly applied to fiber lasers; and it is likely that pulse lasers with highly repetitive frequencies, whose pulse-time width is short, are obtainable from mode-locked fiber laser apparatuses. However, since the pulse energy of the obtainable pulse lasers is small, it is necessary to amplitude the pulse lasers in order to make them applicable to spectroscopic measurements, material processing, wavelength conversions, and so on.

On the other hand, a Q-switch technique is one in which, while a gain medium is being excited, an oscillation is suppressed by making the loss of oscillator larger so in order to lower the Q-value, and then the oscillator is caused to oscillate by making the loss smaller suddenly in order to raise the Q-value. Q-switch techniques are mainly applied to solid lasers; and it is likely that pulse lasers with lowly repetitive frequencies, whose pulse energy is large, are obtainable from Q-switch-type solid laser apparatuses.

For the Q-switch-type solid laser apparatuses, the following are available: active Q-switch laser apparatuses in which the Q-value is changed with active devices like electrooptic modulation devices; and passive Q-switch laser apparatuses in which the Q-value is changed with passive devices like saturable absorbers.

In the active Q-switch laser apparatuses, it is not possible to make the time width of pulse shorter because the active device is so large that it is not possible to make an interval between oscillators shorter. Moreover, the active Q-switch laser apparatuses have also had such a problem that they require a high voltage in order to drive the active device.

Since it is possible for the passive Q-switch laser devices to cancel the problems of the aforementioned active Q-switch laser apparatuses, the research and development have been recently carried out extensively.

John J. Zayhowski developed a passive Q-switch-type solid laser apparatus in which $Nd^{3+}$:YAG (i.e., a gain medium) was diffusion joined to $Cr^{4+}$:YAG (i.e., a saturable absorber), and in which they were sandwiched with oscillator mirrors (see Non-patent Literature No. 1, for instance).

In this apparatus of John J. Zayhowski, the peak power is enhanced by making the oscillator length shorter, and thereby the following are achieved: 218-ps pulse-time width; and 4-μJ pulse energy (or 18-kW peak power) at 70-kHz maximum repetitive frequency.

Yingxin Bai et al. developed a passive Q-switch-type solid laser apparatus in which $Nd^{3+}$: $YVO_4$ (i.e., again medium) and $Cr^{4+}$:YAG (i.e., a saturable absorber) were used (see Non-patent Literature No. 2, for instance).

In this apparatus of Yingxin Bai et al., the following are achieved by making the gain medium's beam diameter larger than the saturable absorber's effective beam diameter: 28-ns pulse-time width; and 20-μJ pulse energy (or 0.7-kW peak power). Note that, since a laser diode (or LD) exclusively for quasi CW is used for the excitation means in this case, the repetitive frequency is limited to from a few dozens of Hz and up to 100 Hz approximately at a maximum.

H. Sakai et al. developed a passive Q-switch-type solid laser apparatus in which $Nd^{3+}$:YAG (i.e., again medium) and $Cr^{4+}$:YAG (i.e., a saturable absorber) were used (see Non-patent Literature No. 3, for instance).

In the apparatus of H. Sakai et al., the oscillator length is made shorter by turning the gain medium into a microchip so that the peak power is enhanced, and thereby the following are achieved: 580-ps pulse-time width; and 0.69-mJ pulse energy (or 1.2-MW peak power). Note that, in this case, the repetitive frequency is suppressed down to 100 Hz at a maximum in order to reduce thermal problems.

RELATED TECHNICAL LITERATURE

Non-Patent Literature

Non-patent Literature No. 1: John J. Zayhowski, "Microchip Lasers," Optical Materials, 11, 1999, pp. 255-267;
Non-patent Literature No. 2: Yingxin Bai et al., "Passively Q-switched $Nd:YVO_4$ laser with a $Cr^{4+}$:YAG crystal saturable absorber," Applied Optics, Vol. 36, No. 12, 20 Apr. 1997, pp. 2468-2472; and
Non-patent Literature No. 3: H. Sakai et al., ">1-MW peak power single-mode high-brightness Q-switched $Nd^{3+}$: YAG microchip laser," Optics Express, Vol. 16, No. 24, 24 Nov. 2008, pp. 19891-19899

SUMMARY OF THE INVENTION

Assignment to be Solved by the Invention

An apparatus, which generates a high peak-power pulse laser whose pulse energy is large at such a high repetitive frequency that goes beyond kHz, and whose pulse-time width is small, is desired in order to make it applicable to spectroscopic measurements, material processing, wavelength conversions, and so on. However, in the aforementioned conventional passive Q-switch-type solid laser apparatuses, it has been difficult to achieve a high peak power while maintaining the highly repetitive characteristics.

The present application is one which has been done in view of the problems of the aforementioned conventional passive Q-switch-type solid laser apparatuses. It is an assignment to it to provide a passive Q-switch-type solid laser apparatus for outputting a high peak-power pulse laser, whose pulse energy is large and pulse-time width is small, in a highly repetitive manner.

Means for Solving the Assignment

A passive Q-switch-type solid laser apparatus according to the present invention, which has been done in order to solve the above-mentioned assignment, is characterized in that:
the passive Q-switch-type solid laser apparatus has:
a plurality of reflection elements for forming an oscillator;
a solid gain medium being disposed inside said oscillator;
a saturable absorber being disposed inside said oscillator;
an excitation means for exciting said solid gain medium; and
a cross section control means for making at least one of a stimulated emission cross section of said solid gain medium and an absorption cross section of said saturable absorber closer to another one of them; and said cross section control means is equipped with at least one of a temperature control means for retaining said solid gain medium at a predetermined temperature and an oscillatory-wavelength control means for fixating an oscillatory wavelength at a predetermined wavelength, or both of them.

Since the simulated emission cross section of the solid gain medium is close to the absorption cross section of the saturable absorber, breaching the saturable absorber by means of a stimulated emission light can be carried out at a faster rate and with a better efficiency. As a result, it is possible to generate a high peak-power pulse laser whose pulse energy is large and pulse-time width is small.

Moreover, said predetermined temperature can preferably be room temperature or more.

Compared with a case where the solid gain medium is retained at a low temperature that is room temperature or less, the problem of dew condensation disappears, and it is allowable that the cooling capacity of the temperature control means can be lower.

Moreover, said temperature control means can preferably include a high thermal-conductivity medium for sandwiching said solid gain medium.

When the solid gain medium is sandwiched with a high thermal-conductivity medium, it is possible to make an in-face temperature distribution of the solid gain medium uniform by utilizing the solid thermal conduction. As a result, it is possible to excite the solid gain medium with a high-power CW excited light, so that it is possible to output a high peak-power pulse laser whose pulse energy is large and pulse-time width is small in a highly repetitive manner.

Moreover, said oscillatory-wavelength control means can preferably be a volume Bragg grating.

Thus, it is possible to make the resulting band width of an oscillatory wavelength narrower.

Moreover, said solid gain medium can preferably include an Nd:rare-earth vanadate single crystal.

Since an Nd:rare-earth vanadate single crystal has a large absorption coefficient and gain cross section, it is possible to take out a large pulse energy therefrom. In addition, since the excited wavelength of rare-earth vanadate is present in the near-infrared region, it is possible to use a laser diode bar for an excitation light source. As a result, it is possible to intend to downsize the apparatus.

Moreover, said high thermal-conductivity medium can preferably be SiC.

Since Si is transparent to the excited wavelength of rare-earth vanadate, it is possible to do end pumping (or end-face excitation) by sandwiching the gain medium therewith.

Moreover, said Nd:rare-earth vanadate can preferably be Nd:YVO$_4$.

Since Nd:YVO$_4$ has a larger absorption coefficient and gain cross section than do the other Nd:rare-earth vanadates, it is possible to take out a much larger pulse energy therefrom.

Moreover, said saturable absorber can preferably include a single crystal being doped with tetravalent Cr.

A single crystal being doped with tetravalent Cr is stable chemically and thermally compared with dyes or pigments and Li:F$_2$ crystals, so that it exhibits a high doping density.

Moreover, said single crystal being doped with tetravalent Cr can preferably be Cr$^{4+}$:YAG.

Since Cr$^{4+}$:YAG shows a polarized-light dependent absorption characteristic, a polarized laser can be outputted without any polarization device.

Effect of the Invention

Since the stimulated emission cross section of the solid gain medium is close to the absorption cross section of the saturable absorber, breaching the saturable absorber by means of a stimulated emission light can be carried out at a faster rate and with a better efficiency. As a result, it is possible to generate a high peak-power pulse laser whose pulse energy is large and pulse-time width is small.

MODE FOR CARRYING OUT THE INVENTION

Embodiment Mode No. 1

Figure 1:
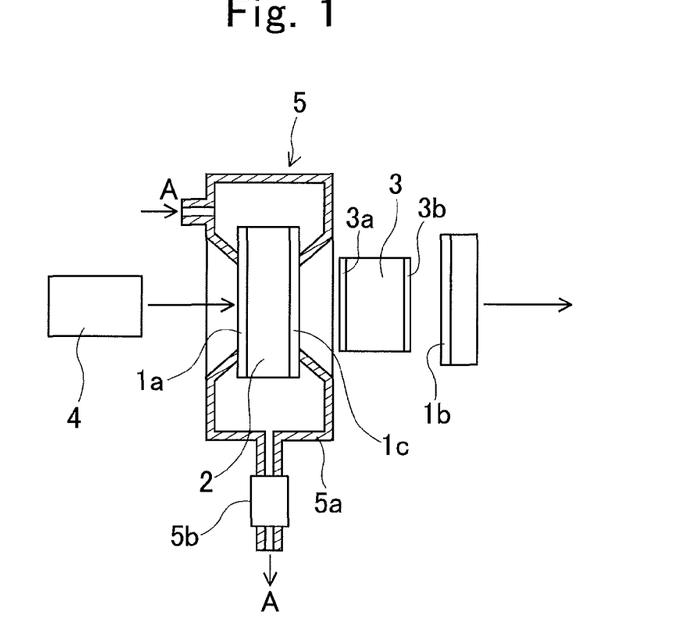
FIG. 1 is an outlined constitutional diagram of a passive Q-switch-type solid laser apparatus according to Embodiment Mode No. 1 of the present invention.

As illustrated in FIG. 1, a passive Q-switch-type solid laser apparatus according to this embodiment mode was equipped with two reflection elements (1$a$, 1$b$) for forming an oscillator, a solid gain medium 2 being disposed between the two reflection elements (1$a$, 1$b$), a saturable absorber 3 being disposed between the two reflection elements (1$a$, 1$b$), an excitation means 4 for exciting the solid gain medium 2, and a cross section control means 5 for making at least one of a stimulated emission cross section of the solid gain medium 2 and an absorption cross section of the saturable absorber 3 closer to another one of them.

It is preferable that the solid gain medium 2 can be an Nd:rare-earth vanadate single crystal in which rare-earth vanadate is doped with Nd. Note that, as for an Nd:rare-earth vanadate, the following can be given: Nd:ScVO$_4$, Nd:YVO$_4$, Nd:LaVO$_4$, Nd:CeVO$_4$, Nd:PrVO$_4$, Nd:NdVO$_4$, Nd:PmVO$_4$, Nd:SmVO$_4$, Nd:EuVO$_4$, Nd:GdVO$_4$, Nd:TbVO$_4$, Nd:DyVO$_4$, Nd:HoVO$_4$, Nd:ErVO$_4$, Nd:TmVO$_4$, Nd:YbVO$_4$, and Nd:LuVO$_4$. Among these, those whose laser action has been ascertained until now are the following: Nd:YVO$_4$, Nd:PrVO$_4$, Nd:NdVO$_4$, Nd:HoVO$_4$, Nd:ErVO$_4$, Nd:TmVO$_4$, and Nd:YbO$_4$.

Since an Nd:rare-earth vanadate single crystal exhibits a large absorption coefficient and gain cross section, it is possible to take out a large pulse energy therefrom. In addition, since the excited wavelength of rare-earth vanadate is present in the near-infrared region, it is possible to use a laser diode bar for an excitation light source. As a result, it is possible to intend to downsize the apparatus.

In the present embodiment mode, an Nd:YVO$_4$ single crystal was used as the solid gain medium 2. Since Nd:YVO$_4$ exhibits an absorption coefficient and gain cross section that are larger than those of the other Nd:rare-earth vanadates, it is possible to take out a much larger energy therefrom.

The Nd:YVO$_4$ single crystal 2 was an "a"-cut crystal in which Nd had been doped in an amount of 1 atomic %, and was a rectangular plate whose thickness was 1 mm, and one of whose opposite sides had 7 mm.

On one of the faces of the Nd:YVO$_4$ single crystal 2, a film with a high reflectivity (e.g., a reflectivity, "R," >99%) with respect to a light with an oscillatory wavelength $\lambda_{em}$ (~1,064 nm) was formed, so that this film was the reflection element 1a for forming the oscillator. Note that, in order to make a later-described excited light likely to transmit, the reflection element 1a had a high transmissivity (e.g., a transmissivity, "T," >97%) with respect to a light with an excited-light wavelength.

On the other one of the faces of the Nd:YVO$_4$ single crystal 2, an antireflection film 1c (e.g., whose reflectivity, "R," was <0.1%) was formed with respect to the light with the oscillatory wavelength $\lambda_{em}$.

The reflection element 1b for taking out output was a film that was formed on a substrate, and that film had an 80% reflectivity with respect to the light with the oscillatory wavelength $\lambda_{em}$ (i.e., a transmissivity, "T,"=20%).

As for the saturable absorber 3, single crystals that are doped with tetravalent Cr are preferable, although it is possible to use any of the following: solid saturable absorbers, semiconductor saturable absorbers, dye saturable absorbers, and the like.

A single crystal that is doped with tetravalent Cr is stable chemically and thermally compared with dyes and Li:F$_2$ crystals, so that is possible to enhance the doping density.

Because of employing Nd:YVO$_4$ as the solid gain medium 2 in the present embodiment mode, a linear polarized laser could be output without any polarizing device, due to the gain anisotropy.

On both faces of the Cr$^{4+}$:YAG single crystal 3, antireflection films (3a, 3b) (e.g., whose reflectivity, "R," was <0.1%) were formed, respectively, and thereby the Cr$^{4+}$:YAG single crystal exhibited an initial transmissivity of 70% with respect to the light with the oscillatory wavelength $\lambda_{em}$.

As for the excitation means 4, LDs (i.e., laser diodes) are preferable, although it is possible to use any of the following: Kr arc lamps, LEDs (i.e., light-emitting diodes), LDs, and the like.

An LD can emit a coherent light with a wavelength that matches the absorption wavelength of the gain medium 2, compared with Kr arc lamps and LEDs. The excited light that matches the absorption wavelength of the gain medium leads to making it possible to heighten the laser-oscillation efficiency (i.e., output power/input power). When the excited light is coherent, it is possible to irradiate the gain medium 2 with the excited light efficiently with a simple optical system.

In the present embodiment mode, a fiber-coupled-type LD (e.g., "JOLD-120-QPXF-2P," JENOPTIK, Germany) was used. The fiber-coupled-type LD can output a CW laser light (e.g., whose repetitive frequency is 1 kHz, pulses-time width is 150 µs, and average power is 20 W), which is capable of operating in a quasi CW manner at 808 nm, so as to make the output CW laser light match the absorption wavelength of the Nd:YVO$_4$ single crystal 2. Note that an excitation at a wavelength, such as about 879 nm or 888 nm, which makes it possible to directly excite a light to the upper laser level, is also preferable.

The cross section control means 5 was a temperature control means for retaining the solid gain medium 2 at a predetermined temperature. The temperature control means was equipped with a doughnut-shaped jacket 5a in which a solvent circulated, and a cold heat source 5b for supplying the solvent with a predetermined temperature into the jacket 5a. The periphery of the solid gain medium 2 was disposed so as to be immersed into the solvent that circulated within the jacket.

The stimulated emission cross section of gain medium is proportional to the number of atoms under excited conditions. Since the number of atoms under excited conditions decreases when the temperature of the gain medium rises, the temperature is usually lowered as much as possible in order to cause laser oscillation.

Incidentally, the stimulated emission cross section $\sigma_e$ of the Nd:YVO$_4$ single crystal (i.e., gain medium) 2 was too large relatively compared with the absorption cross section $\sigma_a$ of the Cr$^{4+}$:YAG single crystal (i.e., saturable absorber) 3. Hence, in the passive-type solid Q-switch laser apparatus according to Embodiment No. 1 of the present invention, the temperature of the Nd:YVO$_4$ single crystal (i.e., gain medium) 2 was raised so that the $\sigma_e$ was lowered to make it closer to the $\sigma_a$.

To be concrete, the Nd:YVO$_4$ single crystal (i.e., gain medium) 2 was retained at 30° C. with the temperature control means 5. Note that, in a case of doing the excitation more strongly, since the heat generation resulting from the quantum deficiency between excited light and laser-oscillation light is so great that it become difficult to retain the uniformity of temperature distribution within the face of laser medium, it is necessary to intend to do temperature control by joining a transparent material with a high thermal conductivity, for example, SiC, onto the laser medium on one of the cross sections, or on both of them (see Embodiment Mode No. 3).

From the passive-type solid Q-switch laser apparatus according to Embodiment Mode No. 1 of the present invention with the aforementioned constitution, a giant pulse with 0.5-MW peak power (or whose pulse energy was 330 µJ and pulse-time width was 80 ps), and with 1-kHz repetitive frequency, was obtained.

Next, experimental results and a theoretical model, which resulted in arriving at creating the present invention, will be explained. An experiment was carried out making use of the passive-type solid Q-switch laser apparatus according to the present embodiment mode shown in FIG. 1. In the experiment, the Nd:YVO$_4$ single crystal (i.e., gain medium) 2 was retained at various temperatures with the temperature control means 5, and thereby the temperature dependencies of the resulting pulse energy and pulse-time width were examined.

Figure 2:
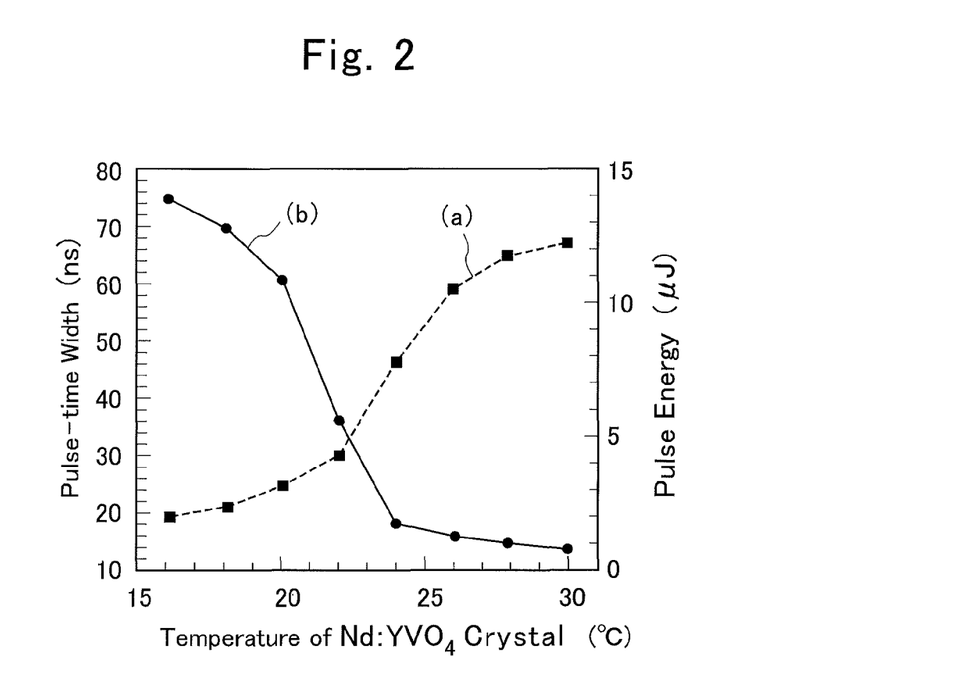
FIG. 2 is a graph for showing the temperature dependencies of pulse-time width and pulse energy.

FIG. 2 is a graph that illustrates the temperature dependencies of the obtained pulse energy and pulse-time width. The horizontal axis specifies the temperature of the Nd:YVO$_4$ single crystal (i.e., gain medium) 2, and the vertical axes specify the pulse energy and pulse-time width; and the curve (a) shows the pulse energy, and the curve (b) shows the pulse-time width.

FIG. 2 illustrates that, when the temperature of the Nd:YVO$_4$ single crystal (i.e., gain medium) 2 is heated from 16° C. to 30° C., the pulse energy changes from 2 µJ to 12 µJ, and the pulse-time width changes from 80 ns to 10 ns. It is understood from FIG. 2 that, when making the temperature higher by 14° C., the pulse energy is enhanced by six times, and the pulse-time width decreases by eight times. Therefore, it is understood that, when making the temperature higher by 14° C., the peak power is enhanced by 48 times.

Moreover, in order to elucidate a mechanism by which the results of aforementioned FIG. 2 were brought about, the temperature dependency of fluorescent spectra of the Nd:YVO$_4$ single crystal (i.e., gain medium) 2 was examined.

Figure 3:
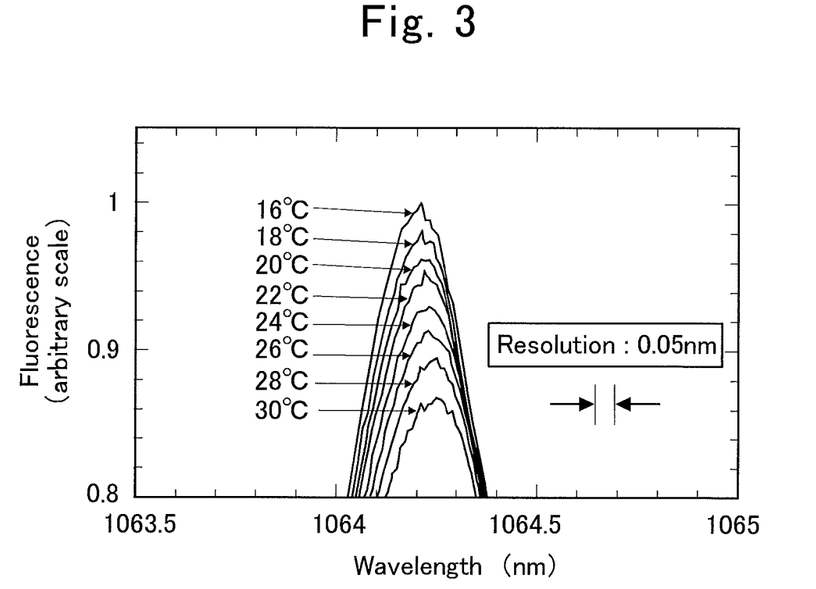
FIG. 3 is a graph for showing fluorescence, graph in which the temperatures are regarded as a parameter.
Figure 4:
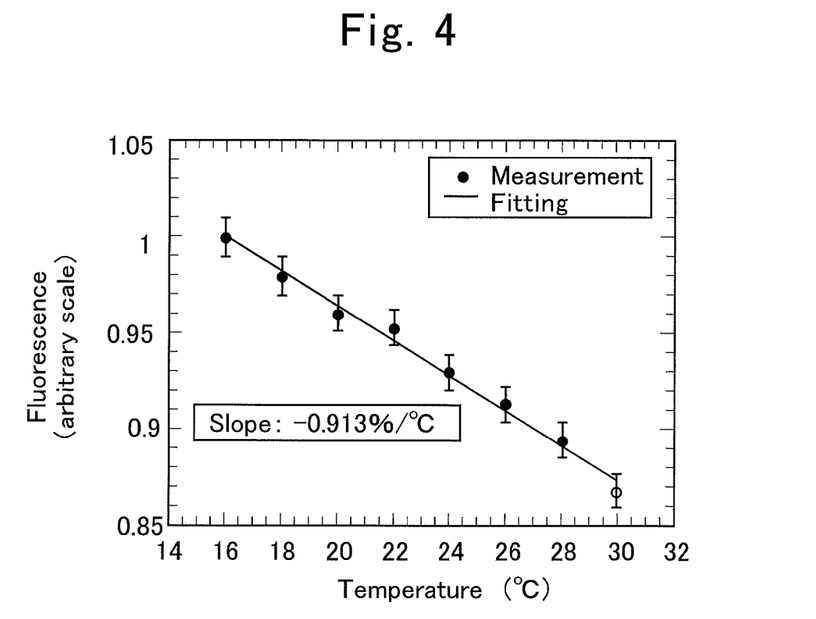
FIG. 4 is graph for showing a relationship between the temperatures and the peaks of the fluorescence that were obtained from FIG. 3.

FIG. 3 is the fluorescent spectra in which the temperatures are regarded as a parameter; and the horizontal axis specifies the wavelengths, and the vertical axis specifies the fluorescent intensities. FIG. 4 is a graph that illustrates a relationship between the peak values and temperatures in FIG. 3, whereas FIG. 5 is a graph that illustrates a relationship between the central wavelengths and temperatures in FIG. 3.

Figure 5:
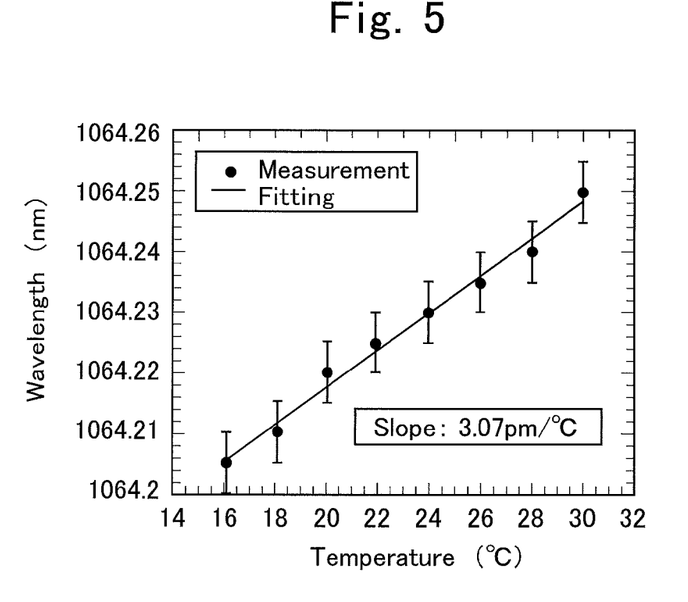
FIG. 5 is graph for showing a relationship between the temperatures and the peak wave lengths of the fluorescence that were obtained from FIG. 3.

It is understood from FIG. 3 through FIG. 5 that the peak of the fluorescence and the shift amount of the central wavelengths, and the temperatures fall in a linear relationship, respectively. The facts mean the following: assuming that the stimulated emission cross section $\sigma_e$ of the Nd:YVO$_4$ single crystal (i.e., gain medium) 2 is proportional to the peak of the fluorescence, the peak of the fluorescence declines by 12% and the $\sigma_e$ decreases by 12% when the temperature becomes higher by 14° C.

Laser rate equations were introduced, and thereby comparisons between model calculations and the measured values were carried out.

The pulse energy $E_p$, peak power $P_p$, and pulse-time widths $t_p$ being found out from the laser rate equations can be expressed as set forth in the following formulas (See N. Pavel et al., "High Average Power Diode End-pumped Composite Nd:YAG Laser Passively Q-switched by Cr$^{4+}$:YAG Saturable Absorber" Jpn. J. Appl. Phys., Vol. 40 (2001), pp. 1253-1259).

$$E_p = (h\nu A_g / 2\sigma_e \gamma_g)\ln(1/R)\ln(n_{gi}/n_{gf}) \qquad (1)$$

$$P_p = (h\nu A_g l_g / \gamma_g t_r)\ln(1/R)n_{gi}[(1 - n_{gt}/n_{gi}) + \\ \{p(1 - \delta)(1 - n_{gt}^\alpha/n_{gi}^\alpha)/\alpha\} + \{1 - p(1-\delta)\}\ln(n_{gt}/n_{gi})] \qquad (2)$$

$$t_p = E_p / P_p \qquad (3)$$

wherein $$\alpha = (\gamma_{SA}/\gamma_g)(\sigma_a/\sigma_e)(A_g/A_{SA}) \qquad (4)$$

$$\delta = \sigma_{ESA}/\sigma_a \qquad (5)$$

$$p = -\ln T_0^2 / (-\ln R + L - \ln T_0^2) \qquad (6)$$

Note herein that "$n_{gf}$" is a final distribution inversion density; "$n_{ti}$" is a distribution inversion density at the maximum number of photons; "$n_{gi}$" is an initial distribution inversion density; "$\sigma_e$" is a stimulated emission cross section of a gain medium; "$\sigma_a$" is an absorption cross section of a saturable absorber; "$\sigma_{ESA}$" is an ESA cross section; "$l_g$" is a length of the gain medium; "$\gamma_g$" is a thermal-distribution decreasing factor of the gain medium; "$\gamma_{SA}$" is a thermal-distribution decreasing factor of the saturable absorber; "R" is a reflectivity of an output mirror; "$T_0$" is an initial transmissivity of the saturable absorber; "L" is a bidirectional residual light loss; "h" is the Plank's constant; "$\nu$" is a frequency; "$A_g$" is an oscillator-mode effective area within the gain medium; and "$A_{SA}$" is an oscillator-mode effective area within the saturable absorber.

Figure 6:
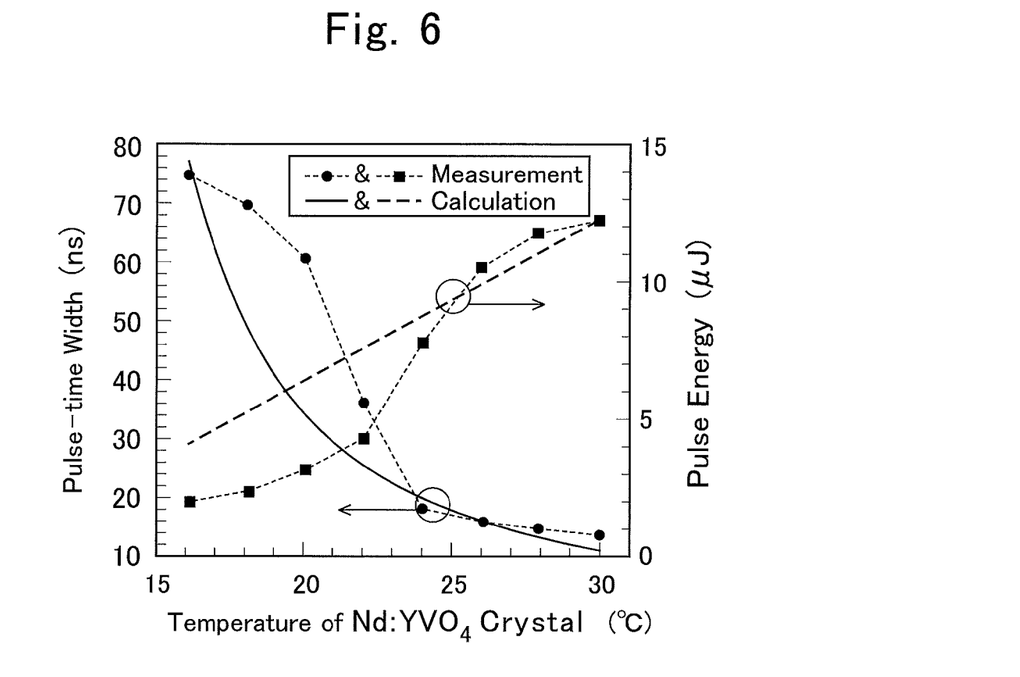
FIG. 6 is a graph for showing a comparison between the temperature dependency of actually measured values of pulse energy and pulse-time width and that of their calculated values.

Calculated values being calculated with use of Formulas (1) through (6), and the measured values are illustrated in FIG. 6. The measured values in FIG. 6 are the same as the measured values in FIG. 2.

It is understood from FIG. 6 that the calculated values and the measured values agree with each other very well. This means that the alteration of the stimulated emission cross section by 12% can fully explain the strong temperature dependencies of the pulse-time width and pulse energy. Moreover, it is understood from this that above-mentioned model Formulas (1) through (6) are right.

Incidentally, it is possible to make the pulse energy larger, and to make the pulse-time width smaller, by making the "$\alpha$" in Formula (4) larger (see Non-patent Literature No. 2). However, it is desirable to control it within a proper range because light damages occur when it is too large.

In Formula (4), since the $(\gamma_{SA}/\gamma_g) \sim 1$ and the $(A_g/A_{SA}) \sim 1$, the following should be satisfied: the $(\sigma_a/\sigma_e) \sim 1$. Therefore, when the $(\sigma_a/\sigma_e) \sim 1$ is met, it is possible to make the pulse energy larger, and to make the pulse-time width smaller.

As being mentioned above, the present invention was created, because it was understood from the experiment and theoretical model that the stimulated emission cross section $\sigma_e$ of the gain medium approaches the absorption cross section $\sigma_a$ of the saturable absorber so that it is possible to make the pulse energy larger, and to make the pulse-time width smaller, when making the temperature of the gain medium higher.

Since the $\sigma_e$ is too large relatively, compared with the $\sigma_a$, in the present embodiment mode, the $\sigma_e$ was made smaller by retaining the temperature of the gain medium 2 higher with the temperature control means 5, and was thereby made closer down to a value that was proper for the $\sigma_a$. In another case where the $\sigma_e$ is too small relatively, compared with the $\sigma_a$, the $\sigma_e$ can be made closer to the $\sigma_a$ by retaining the temperature of the gain medium 2 lower with the temperature control means 5.

In general, since the number of atoms being present at lower levels decreases but the number of atoms being present at higher levels increases when the temperature becomes higher, the absorption cross section of saturable absorber becomes smaller when the temperature becomes higher. On the contrary, the absorption cross section becomes larger when the temperature becomes lower. It is also advisable to make the absorption cross section $\sigma_a$ of the saturable absorber 3 closer to the stimulated emission cross section $\sigma_e$ of the gain medium 2 by attaching the temperature control means 5 onto the saturable absorber 3 so as to retain the temperature of the saturable absorber 3 at lower temperatures.

Figure 7:
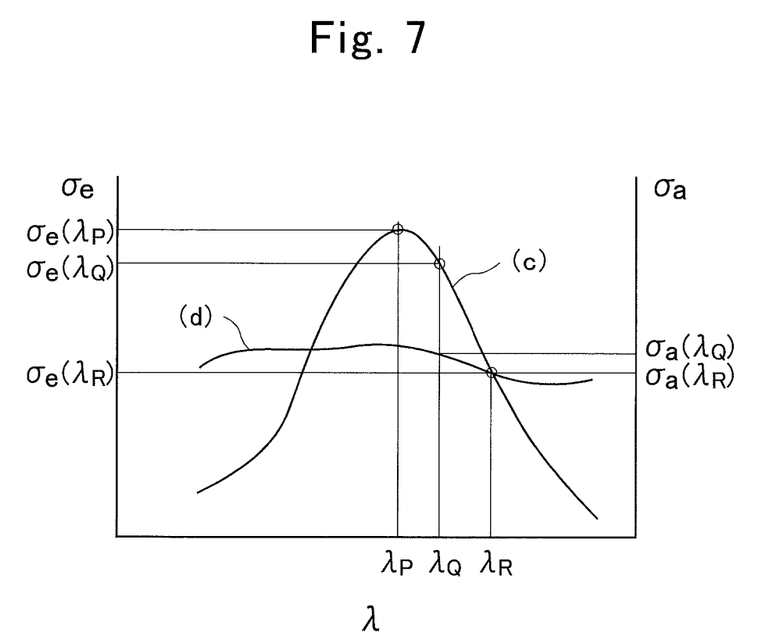
FIG. 7 is a schematic diagram for showing how to make a stimulated emission cross section, $\sigma_e$, which is too large, closer to an absorption cross section, $\sigma_a$, by selecting an oscillatory wavelength.

As being mentioned above, since the values, which were calculated with use of the formulas according to the theoretical model in which the stimulated emission cross section $\sigma_e$ was assumed to be proportional to the peak of the fluorescence, coincided with the measured values, the fluorescent spectra in FIG. 3 can be schematically expressed as (c) in FIG. 7. On the other hand, since the absorption cross section $\sigma_a$ of the saturable absorber exhibits a weak wavelength dependency, it can be schematically expressed as (d) in FIG. 7.

Usually, a laser oscillation occurs at $\lambda_p$, namely, at the peak wavelength of the fluorescence (or at the peak of the stimulated emission cross section $\sigma_e$). In this instance, in a case where the $\sigma_e$ (for $\lambda_p$) is larger than the $\sigma_e$ (for $\lambda_p$) too much relatively, it is not possible to make the pulse energy larger, and to make the pulse-time width smaller.

It becomes feasible however to control the $\sigma_e$ (for $\lambda_R$) within a range that is proper for the $\sigma_a$ (for $\lambda_p$) by fixating an oscillatory wavelength at $\lambda_R$, so that it is possible to make the pulse energy larger, and to make the pulse-time width smaller. Therefore, it is possible to make the $\sigma_e$ closer to the $\sigma_a$ by making an oscillatory wavelength closer to $\lambda_R$ with an oscillatory-wavelength control means, instead of controlling the temperature of the gain medium 2 with the temperature control means 5. Moreover, it is possible to make the $\sigma_e$ closer to a value that is proper for the $\sigma_a$ by making an oscillatory wavelength closer to $\lambda_R$ with an oscillatory-wavelength control means.

Moreover, in order to make the stimulated emission cross section closer to the absorption cross section, it is also advisable to make the stimulated emission cross section smaller from the $\sigma_e$ (for $\lambda_p$) to a value that is proper for the $\sigma_e$ (for $\lambda_Q$) by fixating an oscillatory wavelength at $\lambda_Q$. In this case, in view of an wavelength dependency being seen in the absorption cross section, it follows as well that the absorption cross section is made closer to the stimulated emission cross section by making the absorption cross section larger from the $\sigma_a$ (for $\lambda_R$) to the $\sigma_a$ (for $\lambda_Q$).

Embodiment Mode No. 2

Figure 8:
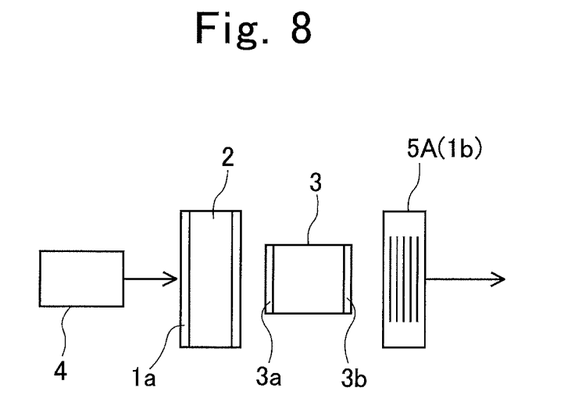
FIG. 8 is an outlined constitutional diagram of a passive Q-switch-type solid laser apparatus according to Embodiment Mode No. 2 of the present invention.

As illustrated in FIG. 8, a passive Q-switch-type solid laser apparatus according to the present embodiment mode was the same as the passive Q-switch-type solid laser apparatus according to Embodiment Mode No. 1 shown in FIG. 1 other than that an oscillatory-wavelength control means 5A, namely, another cross section control means, was used instead of the temperature control means 5 in the passive Q-switch-type solid laser apparatus according to Embodiment Mode No. 1. Identical reference numerals are therefore labeled onto the constituent elements that are the same to each other, and accordingly their explanations will be hereinafter abbreviated.

The oscillatory-wavelength control means 5A is an optical element that also plays a role of the reflection means 1b that constitutes an oscillator, so that it can be an optical element that exhibits a high reflectivity with respect to a light with said wavelength $\lambda_R$, for instance, but that exhibits a low reflectivity with respect to the other lights. For example, as the oscillatory-wavelength control means 5A, it is possible to use diffraction gratings, interference mirrors, etalon plates, and so on.

In the present embodiment mode, a volume Bragg grating was used for the oscillatory-wavelength control means 5A. It is possible to purchase volume Bragg gratings from Opti-Grate Corp. (U.S.A.), for instance. Using a volume Bragg grating for the oscillatory-wavelength control means 5A made it possible to fixate an oscillatory wavelength at $\lambda_R$ in order to make the $\sigma_e$ closer to the $\sigma_a$. Moreover, using a volume Bragg grating for the oscillatory-wavelength control means 5A made it possible to narrow down the oscillatory wavelength's band width (e.g., ~0.7 nm).

Embodiment Mode No. 3

Figure 9:
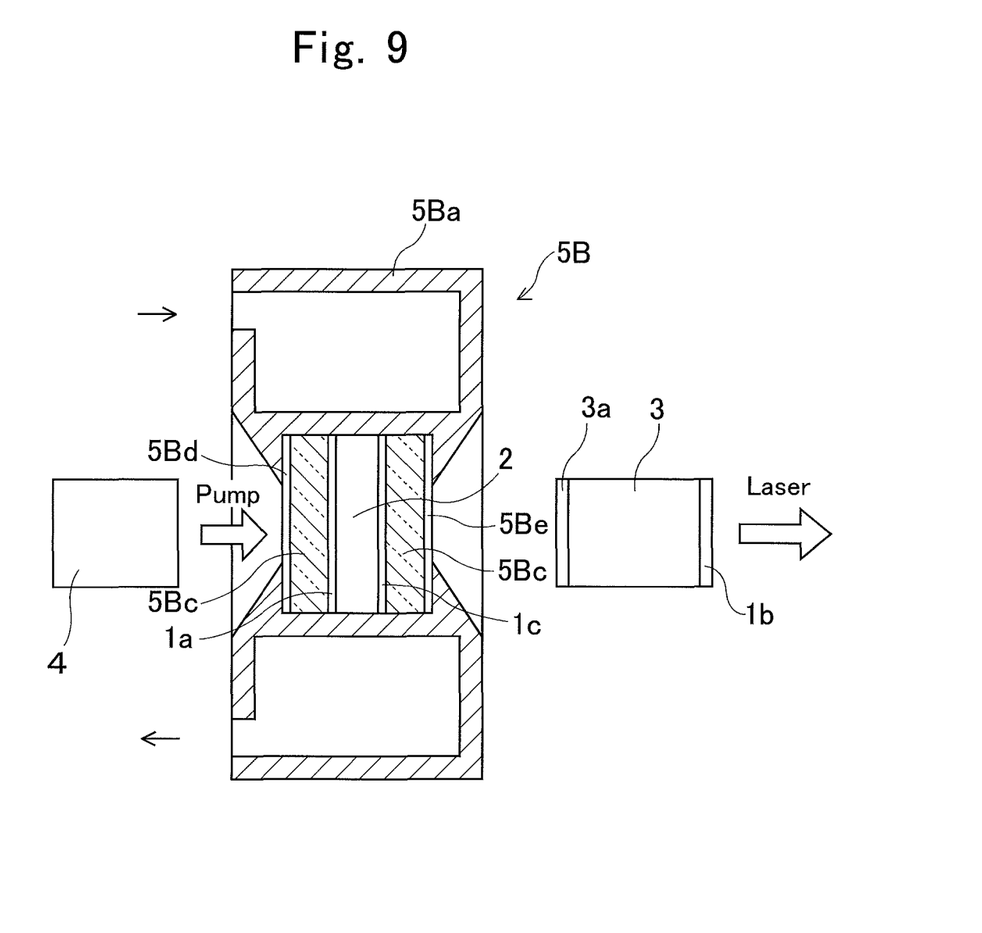
FIG. 9 is an outlined constitutional diagram of a passive Q-switch-type solid laser apparatus according to Embodiment Mode No. 3 of the present invention.

As illustrated in FIG. 9, a passive Q-switch-type solid laser apparatus according to the present embodiment mode was equipped with two reflection elements (1a, 1b) for forming an oscillator, a solid gain medium 2 being disposed between the two reflection elements (1a, 1b), a saturable absorber 3 being disposed between the two reflection elements (1a, 1b), an excitation means 4 for exciting the solid gain medium 2, and a cross section control means 5B for making at least one of a stimulated emission cross section of the solid gain medium 2 and an absorption cross section of the saturable absorber 3 closer to another one of them.

The solid gain medium 2 in the present embodiment mode was an Nd:YVO$_4$ single crystal, is an "a"-cut crystal in which Nd had been doped in an amount of 1 atomic %, and was a rectangular plate whose thickness was 1 mm, and a pair of whose opposite sides had 7 mm.

On one of the faces of the Nd:YVO$_4$ single crystal 2, a film with a high reflectivity (e.g., a reflectivity, "R,">99.99%) with respect to a light with an oscillatory wavelength $\lambda_{em}$ (~1,064 nm, for instance) was formed, so that this film was the reflection element 1a for forming the oscillator. Note that, in order to make a later-described excited light likely to transmit, the reflection element 1a had a high transmissivity (e.g., a transmissivity, "T,">97%) with respect to a light with an excited-light wavelength.

On the other one of the faces of the Nd:YVO$_4$ single crystal 2, an antireflection film 1c (e.g., whose reflectivity, "R," was <0.1%) was formed with respect to the light with the oscillatory wavelength $\lambda_{em}$. This antireflection film is had a high reflectivity with respect to the excited light.

The reflection element 1b for taking out output was a film that was formed on the saturable absorber 3, so that that film had an 80% reflectivity (i.e., a transmissivity, "T,"=20%) with respect to the light with the oscillatory wavelength $\lambda_{em}$ (=1,064 nm).

The saturable absorber 3 was a 110-cut Cr$^{4+}$: YAG single crystal, and was provided with an antireflection film 3a, whose reflectivity, "R," was <0.1% with respect to the light with the oscillatory wavelength $\lambda_{em}$, was formed on one of the opposite sides to the reflection element 1b.

For the excitation means 4 in the present embodiment mode, a CW/QCW laser diode whose oscillatory wavelength was 808 nm and output was 100 W, or a CW/QCW laser diode whose oscillatory wavelength was 880 nm and output was 180 W, could be used.

A cross section control means 5B was a temperature control means for retaining the solid gain medium 2 at a predetermined temperature. The temperature control means 5B was equipped with a doughnut-shaped jacket 5Ba in which a solvent circulated, and paired high thermal-conductivity media 5Bc that sandwiched the solid gain medium 2 therebetween.

Figure 10:
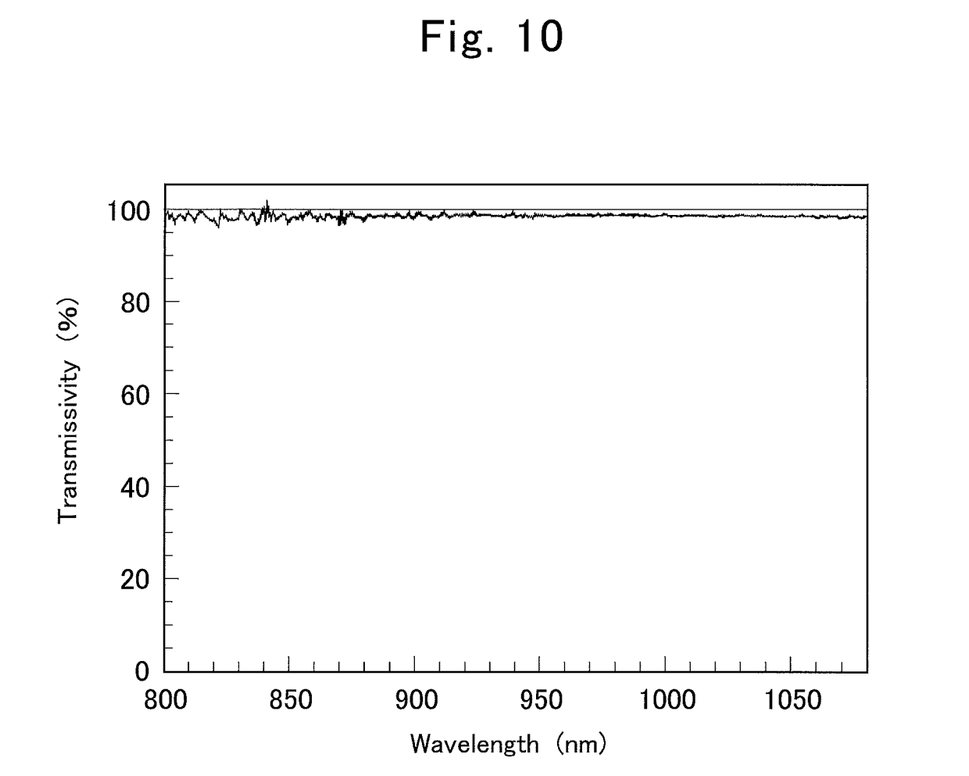
FIG. 10 is the transmission spectrum of SiC in the near-infrared region.

Since it is necessary for the paired high thermal-conductivity media 5Bc that sandwiched the solid gain medium 2 therebetween to be transparent to the excited light and oscillatory light, an SiC single crystal having such a transmission spectrum that is shown in FIG. 10 was used. Since an SiC single crystal had a thermal conductivity that was as high as those of metals, and since it had a high transmissivity over a range of from 800 nm to 1,100 nm, it was excellent as a medium for sandwiching the solid gain medium 2.

One of the paired SiC single crystals 5Bc was provided with a film 5Bd having a high transmissivity with respect to the wavelength of the excited light that was formed on one of the opposite faces to which the excited light was end pumped. Moreover, on a face that faced to the saturable absorber 3, an antireflection film 5Be was formed with respect to the oscillatory wavelength, thereby lowering losses within the cavity.

Since the passive Q-switch-type solid laser apparatus according to the present embodiment mode sandwiched the gain medium 2 whose thickness was 1 mm with the paired SiC single crystals 5Bc so that it did temperature control while making use of the solid thermal conduction, the uniformity of the in-face temperature distribution in the gain medium could be retained. As a result, it was possible to obtain giant pulse lasers with high peak powers and highly repetitive frequencies by increasing a power of the excited light.

EXPLANATION ON REFERENCE NUMERALS (1a, 1b): Two Reflection Elements for Forming Oscillator;
2: Solid Gain Medium (e.g., Nd:Rare-earth Vanadate Single Crystal);

3: Saturable Absorber (e.g., $Cr^{4+}$:YAG Single Crystal);
4: Excitation Means;
5, 5A, and 5B: Cross Section Control Means (e.g., Temperature Control Means, or Oscillatory-wavelength Control Means); and
5Bc: High Thermal-conductivity Medium (e.g., SiC)

The invention claimed is:

1. A passive Q-switch-type solid laser apparatus comprising:
   a plurality of reflection elements for forming an oscillator;
   a solid gain medium being disposed inside the oscillator;
   a saturable absorber being disposed inside the oscillator;
   an excitation element for exciting the solid gain medium; and
   a cross section controller for making at least one of a stimulated emission cross section of the solid gain medium and an absorption cross section of the saturable absorber closer to another cross section thereof, wherein the cross section controller is equipped with at least one of a temperature controller for retaining the solid gain medium at a predetermined temperature and an oscillatory-wavelength controller for fixating an oscillatory wavelength at a predetermined wavelength, the temperature controller including a high thermal-conductivity medium for sandwiching the solid gain medium.

2. The passive Q-switch-type solid laser apparatus as set forth in claim 1, wherein the predetermined temperature is room temperature or greater.

3. The passive Q-switch-type solid laser apparatus as set forth in claim 1, wherein the oscillatory-wavelength controller is a volume Bragg grating.

4. The passive Q-switch-type solid laser apparatus as set forth in claim 1, wherein the solid gain medium includes an Nd:rare-earth vanadate single crystal.

5. The passive Q-switch-type solid laser apparatus as set forth in claim 1, wherein the high thermal-conductivity medium is SiC.

6. The passive Q-switch-type solid laser apparatus as set forth in claim 4, wherein the Nd:rare-earth vanadate single crystal is an Nd:$YVO_4$ single crystal.

7. The passive Q-switch-type solid laser apparatus as set forth in claim 1, wherein the saturable absorber includes a single crystal being doped with tetravalent Cr.

8. The passive Q-switch-type solid laser apparatus as set forth in claim 7, wherein the single crystal being doped with tetravalent Cr is a $Cr^{4+}$:YAG single crystal.

* * * * *